United States Patent [19]

McLellan

[11] Patent Number: 5,325,495

[45] Date of Patent: Jun. 28, 1994

[54] REDUCING STALL DELAY IN PIPELINED COMPUTER SYSTEM USING QUEUE BETWEEN PIPELINE STAGES

[75] Inventor: Edward J. McLellan, Milford, Mass.

[73] Assignee: Digital Equipment Corporation, Maynard, Mass.

[21] Appl. No.: 103,815

[22] Filed: Aug. 9, 1993

Related U.S. Application Data

[63] Continuation of Ser. No. 723,210, Jun. 28, 1991, abandoned.

[51] Int. Cl.$^5$ ............................................. G06F 9/38
[52] U.S. Cl. ............................ 395/375; 364/DIG. 1; 364/261.5; 364/263.1; 364/238.6; 364/262.4; 364/231.8; 395/800
[58] Field of Search ............... 364/DIG. 1 MS File, 364/DIG. 2 MS File; 395/375, 800

[56] References Cited

U.S. PATENT DOCUMENTS

| | | | |
|---|---|---|---|
| 4,777,594 | 10/1988 | Jones et al. | 364/200 |
| 4,974,154 | 11/1990 | Matsuo | 395/375 |
| 5,019,967 | 5/1991 | Wheeler et al. | 395/775 |

OTHER PUBLICATIONS

Troiani et al, "The VAX 8600 I Box, A Pipelined Implementation of the VAX Architecture", Digital Technical Journal, Aug. 1985, pp. 24-42.
Kane, "MIPS R2000 RISC Architecture", Prentice Hall, 1987, pp. 1-1 to 1-14, 2-1 to 2-5, 2-12 to 2-13, 3-13 to 3-16.
Smith, "A Study of Branch Prediction Strategies", 8th Annual Symposium on Computer Architecture, May 12-14, 1981, pp. 135-148.
Bakoglu et al., "The IBM RISC System/6000 processor: Hardware Overview", IBM J. Res. Develop., Jan. 1990, pp. 12-22.
Oehler et al, "IBM RISC System/6000 processor architecture", IBM J. Res. Develop., Jan. 1990, pp. 23-36.
Grohoski, "Machine Organization of the IBM RISC System/6000 processor", IBM J. Res. Develop., Jan. 1990, pp. 37-58.
Losq, "Generalized History Table for Branch Prediction", IBM Tech. Discl. Bulletin, Jun. 1982, pp. 99-101.
Rao, "Techniques for Minimizing Branch Delay . . .", IBM Tech. Discl. Bulletin, Jun. 1982, pp. 97-98.

Primary Examiner—Robert B. Harrell
Attorney, Agent, or Firm—Arnold, White & Durkee

[57] ABSTRACT

A pipelined computer system employs a queue stage to receive the output of one pipeline stage when a stall occurs in the next stage or downstream of the next stage. This avoids stalling earlier stages of the pipeline. Subsequently, the pipeline advances through the queue, until a bubble occurs. When a bubble is subsequently generated upstream and enters the queue stage, a multiplexer switches the input of the next stage to receive the output of the one stage instead of from the queue stage, and the content of the queue is overwritten. By this mechanism, the delays inherent in processing branches can be reduced.

20 Claims, 3 Drawing Sheets

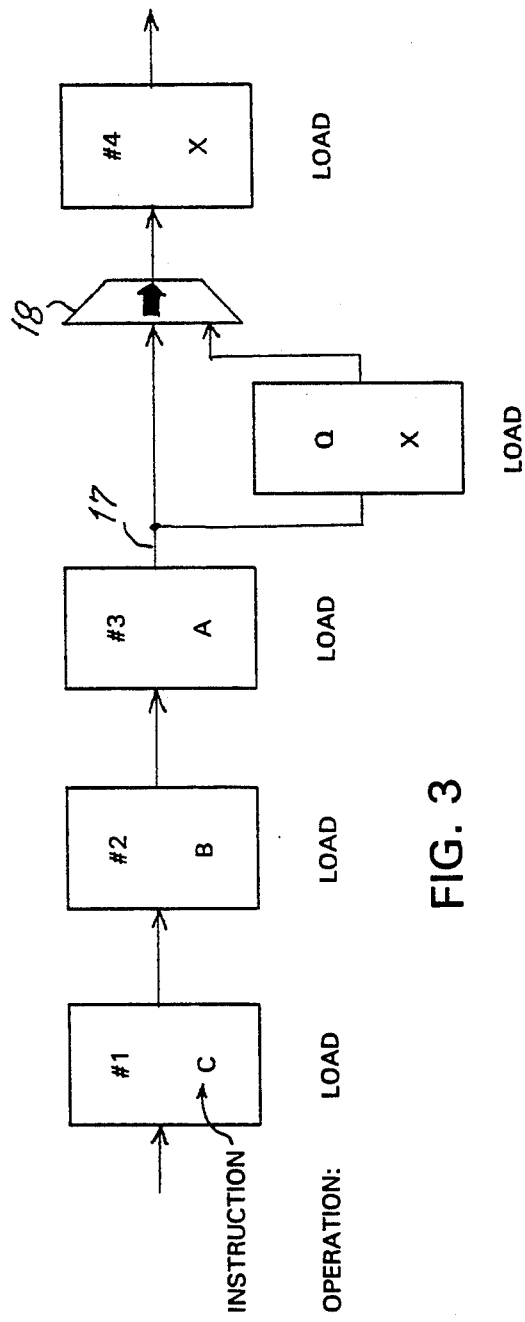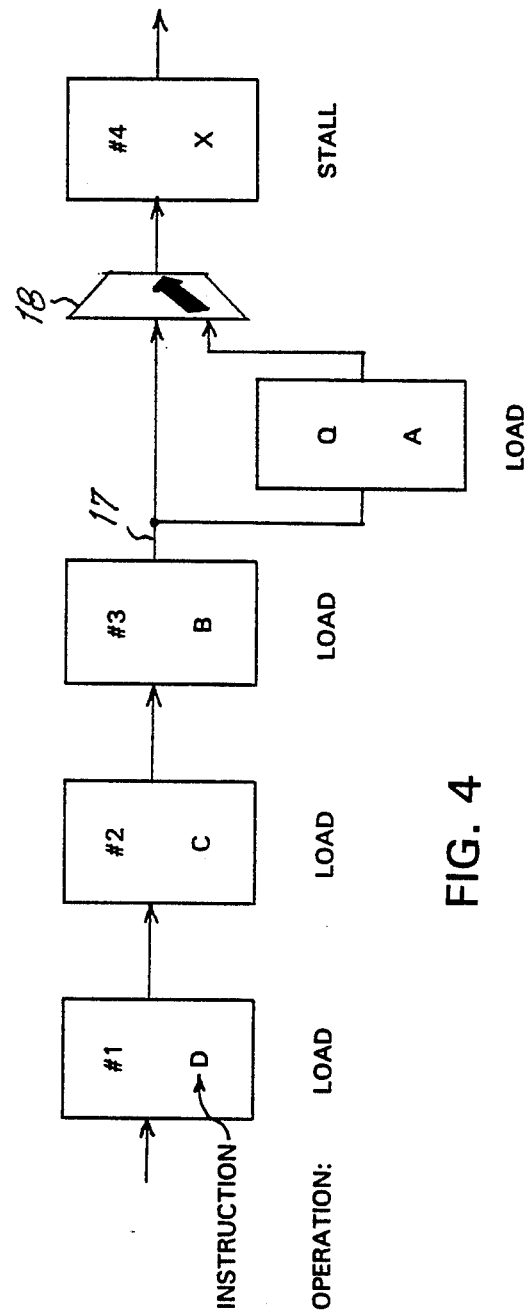

REDUCING STALL DELAY IN PIPELINED COMPUTER SYSTEM USING QUEUE BETWEEN PIPELINE STAGES

RELATED APPLICATIONS

This application is a continuation of an earlier filed U.S. application Ser. No. 07/723,210, filed Jun. 28, 1991 and now abandoned.

BACKGROUND OF THE INVENTION

This invention relates to computer systems and methods of operating computer systems, and more particularly to a method of reducing branch delay in a computer system of the pipelined type.

Computer systems, as in many systems designed for peak operating efficiency and speed, are often pipelined. The method of pipelining a computer system is analogous to that of a manufacturing assembly line. A specific task is broken into multiple smaller tasks that are performed sequentially by a series of job stations, or pipeline stages. Peak efficiency is achieved when all stages are kept busy doing useful work toward a final product. This implies that all tasks require approximately the same amount of time to complete. In the case of a computer system, the work consists of tasks required to process an instruction in the correct instruction flow for the program being processed.

Computer programs generally contain branch instructions, which can alter the flow of instructions necessary to complete a program. It is the combination of fast arithmetic operations and flexibility provided by branch instructions that produce the power of computer system. There are two forms of branch instruction, unconditional and conditional. Unconditional branches are used when a program is required to change instruction flow regardless of any data condition. Conditional branches require examination of some data before resolving the correct program flow. In either case, when a branch changes the flow of instructions from the sequential path, the branch is said to be taken. Non-taken branches are caused by conditional branches that have failed the branch condition test.

Branch instructions that are taken, or predicted to be taken, create unique problems when applying the principles of pipelining to a computer system. When a computer system encounters a branch instruction, it is typically presented with two possible paths of program execution. Executing both paths is currently prohibitively expensive, but waiting until the branch condition is resolved can idle pipeline stages ahead, which require new input to be kept busy. For this reason, many computer systems implement some form of branch prediction. If the branch is predicted incorrectly, then all instructions fetched down the incorrect instruction path must be canceled and the pipeline restarted down the correct path. If the branch is predicted correctly, then idle time has been minimized and the pipeline can proceed. It is important to note that if the branch instruction itself is used to determine the correct path of program execution, this idle time cannot be eliminated but only minimized.

One way of avoiding the waste of this idle time is a technique referred to as delayed branching and implemented in a RISC processor made by MIPS Computer Systems, Inc., and sold under the part number R2000. This processor is described by Lane in *MIPS R2000 RISC ARCHITECTURE*, published by Printice-Hall, 1987. The delayed branching technique will be explained as follows.

Assume that the first pipeline unit, or stage, accomplishes the task of fetching instructions. The second pipeline unit serves to decode these instructions and direct the fetch unit with an address of the next instruction to fetch. When the pipeline is processing non-branch instructions, it simply fetches at sequential addresses to supply the next needed instruction. Consider the case of a taken branch instruction; since the branch instruction is needed to determine the address of the next instruction to fetch, there is one time-slot while the decode unit is processing the branch that it cannot direct the fetch unit where to locate the next instruction. Since the instruction fetch unit cannot be redirected until the branch passes through the decode unit, the branch instruction appears to take two time-slots to process. The second time-slot does not have the address of the branch target yet and therefore cannot redirect the instruction flow until the third time-slot. Some computer systems (such as the MIPS R2000, as well as SPARC and HP) attempt to provide useful work in this time-slot by defining the instruction immediately following a branch as always valid. This is the method referred to as delayed-branching. In this way, the time required to redirect the instruction flow is utilized fetching this extra instruction. The challenge of this method comes in finding an instruction that will provide useful work at this program junction. There exist other drawbacks to this approach as well.

In U.S. Pat. No. 5,019,967, issued to William R. Wheeler and George M. Uhler, assigned to Digital Equipment Corporation, a method of pipeline bubble compression in a computer system is disclosed. This method provides a way of compressing bubbles by overwriting a bubble when a stall condition is detected downstream of the bubble. This may be referred to as a bubble squash technique.

SUMMARY OF THE INVENTION

If the delayed-branch scheme is not employed, the problem of the extra time-slot still exists. According to this invention, an alternative to the delayed-branch scheme is provided that attempts to maximize the useful work of the pipeline while allowing the instruction fetch unit to be idle for one time-slot after taken branches. Returning to the analogy of the manufacturing assembly line, the instruction fetch unit can be compared to the first assembly stage of an automobile. Assume that the first stage of the assembly process requires that the chassis be painted and allowed to dry. Unfortunately, (in this analogy) red cars we will say require twice as much drying time. This case is similar to the branch instruction because branch instructions require two time-slots before the instruction fetch unit can proceed. When red cars are begun, an idle time-slot or bubble is inserted into the assembly line after the first time-slot expires while the red chassis is allowed it's extra drying time. If this bubble is allowed to proceed through the entire line, it would reduce the total number of cars capable of being built that day by one. In other words, the throughput of the pipeline would be reduced by one for each red car produced. If this were the only source of pipeline inefficiency, there would be little recourse, however, if other conditions existed that also influenced pipeline processing, there would be reason to try to combine the inefficiencies and avoid additive problems. After all, the total number of cars produced that day is only measured by counting the cars that proceed out of the assembly building and not by what happens inside the building.

If it was known that the assembly line never quite reached it's peak operating efficiency due to occasional parts missing in forward assembly stages, then an opportunity would exist to combine the two negative effects and effectively mask out the problem with red car drying time. Assume that each assembly stage were allowed to accept new work whenever they had a free time-slot. The red car pipeline bubble could then be eliminated at the time of the first missing part pipeline stall. The stage that was idle in the last time-slot due to the red car bubble, would accept a car as would all stages feeding it. All later stages would be forced to stall while waiting for the missing part before advancing because their respective receiving stages would still be occupied by cars that could not advance. This situation is an improvement over the original pipeline sequence because the red car bubble would be effectively eliminated by combining the two potentially negative events. The drawback is that it may not be practical for half of the assembly line to proceed while the other half is stalled if, for instance, all cars advance on one large treadmill. In addition, if the parts supplier suddenly improves his performance, thus eliminating most of the missing part stalls, then the opportunity to mask the red car bubble would be dramatically reduced and the expected improvement provided by the now ample parts supply may not be realized. More and more of the red car bubbles would progress through the entire pipeline and contribute toward reduced production. This scenario is similar to the bubble squash algorithm implemented in the previous designs. As long as additional stalls occur while branch delay bubbles exist in specific pipeline stages, they can be combined to mask the branch delay performance impact.

If the parts supplier improved his performance greatly but still encountered trouble at times, in other words, the pipeline encounters stalls occasionally, but much less frequently, then it would be an improvement to "save" the occasional stall cycle for later combination with a red car bubble. A method of accomplishing this would be to add a queue stage off to the side of the pipeline. The pipeline would function normally until there was a missing part stall. At this time, the stage immediately preceding and feeding the missing part stage would place it's car in the queue stage and accept new work. All stages behind could advance as if there were no stall in that time-slot. In this case, we assume that the queue is only able to hold one car at a time. When the missing part is delivered, the pipeline is allowed to proceed with the queue stage now incorporated as an integral part of the pipeline. It accepts a car each time-slot and advances a car to the missing part stage each time-slot. It does not otherwise accomplish any work. When a red car bubble advances to the newly inserted queue stage, the queue no longer is needed because it does not hold a car. When the time-slot expires, the missing part stage accepts a car directly from it's preceding stage and not the queue. In this way, the red car bubble has been effectively eliminated from the pipeline without requiring that the missing part stall occur during the time the bubble was traveling through the line. Instead, a missing part stall that occurs at any time after the last red car advances to the missing part stage, but before a new red car bubble reaches the missing part stage, is sufficient to eliminate the red car bubble. The advantage of this scheme is directly related to the relaxation of the timing requirements of missing part stalls compared to red car bubbles. In a computer system, this equates to the relationship between the occurrence of pipeline stalls relative to the occurrence of taken branch delay slots.

Compared with the bubble squash algorithm, an additional advantage is gained by avoiding the complication of multiple pipeline advance commands necessary to allow bubble squashing at multiple pipeline stages. Under the bubble squash scheme, each stage capable of advancing while the pipeline was otherwise stalled required a separate control equation. This is required because the ability to advance a stage while a stall condition exists implies knowledge of data in the pipeline. A pipeline stage can advance in the presence of a stall if the stage that it feeds contains a bubble or if any of the stages ahead of that stage are advancing. If multiple stages are used to trap bubbles in an effort to maximize the probability of a squash, then the equations become supersets of one another.

Using the queue stage alternative solution, pipeline stages preceding the queue stage can all receive the same command to advance determined by the state of the queue and any current stall condition. At the first occurrence of a stall, the queue stage would be selected as the source of data for the next pipeline advance. This does not require any change to the control equations for preceding stages. Second and additional stalls would require that the entire pipeline be stopped.

Thus, according to one embodiment of the invention, a pipelined computer system employs a queue stage to receive the output of one pipeline stage when a stall occurs in the next stage or downstream of the next stage. This avoids stalling earlier stages of the pipeline. Subsequently, the pipeline advances through the queue, until a bubble occurs. When a bubble is subsequently generated upstream and enters the queue stage, a multiplexer switches the input of the next stage to receive the output of the one stage instead of from the queue stage, and the content of the queue is overwritten. By this mechanism, the delays inherent in processing branches can be reduced.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIGS. 3 and 4 are diagrams of the advancement of data through the system of FIG. 1 according to the invention.

DETAILED DESCRIPTION OF SPECIFIC EMBODIMENTS

Figure 1:
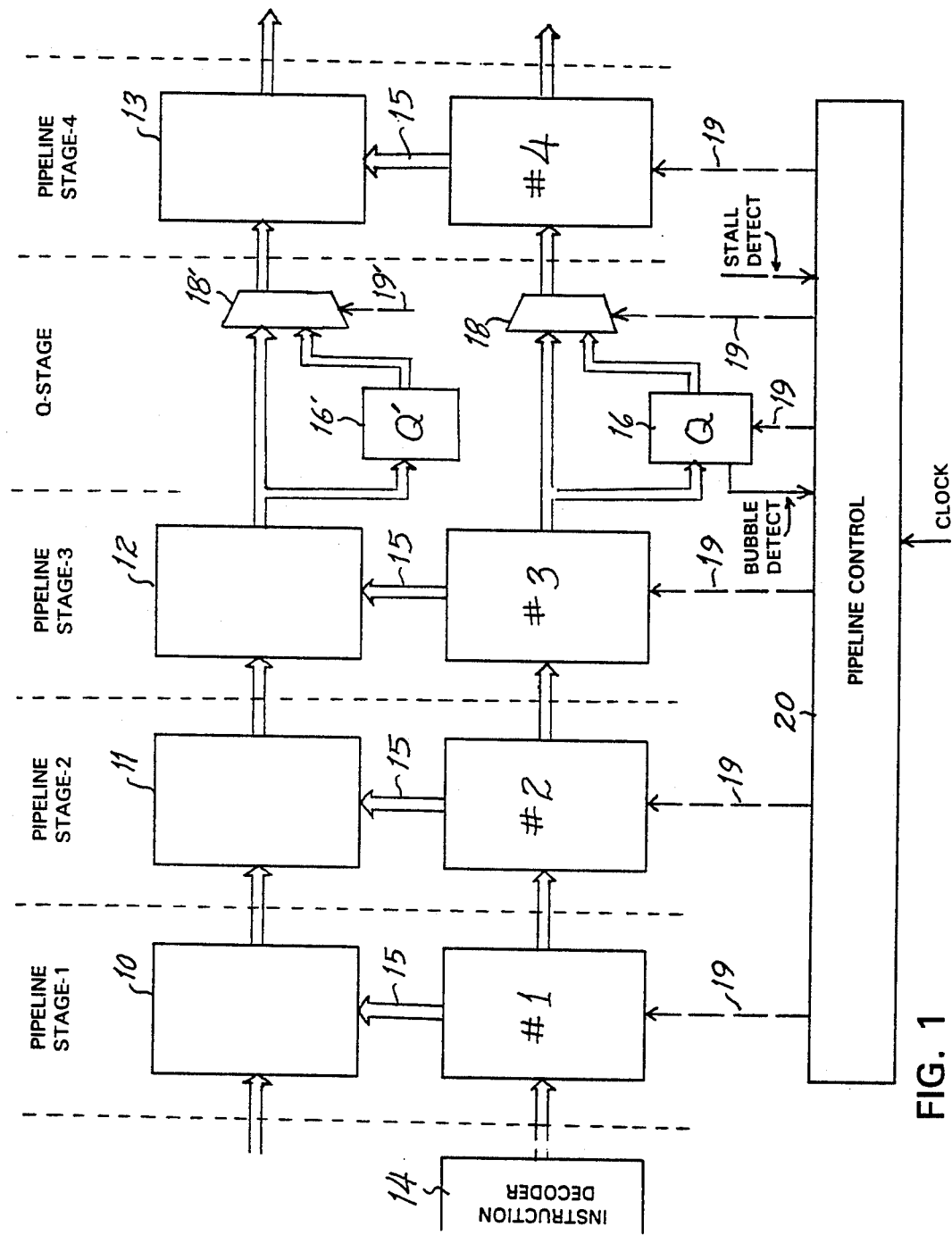
FIG. 1 is a diagram of a part of a pipelined computer system which may use the features of the invention, according to one embodiment.
Figure 2:
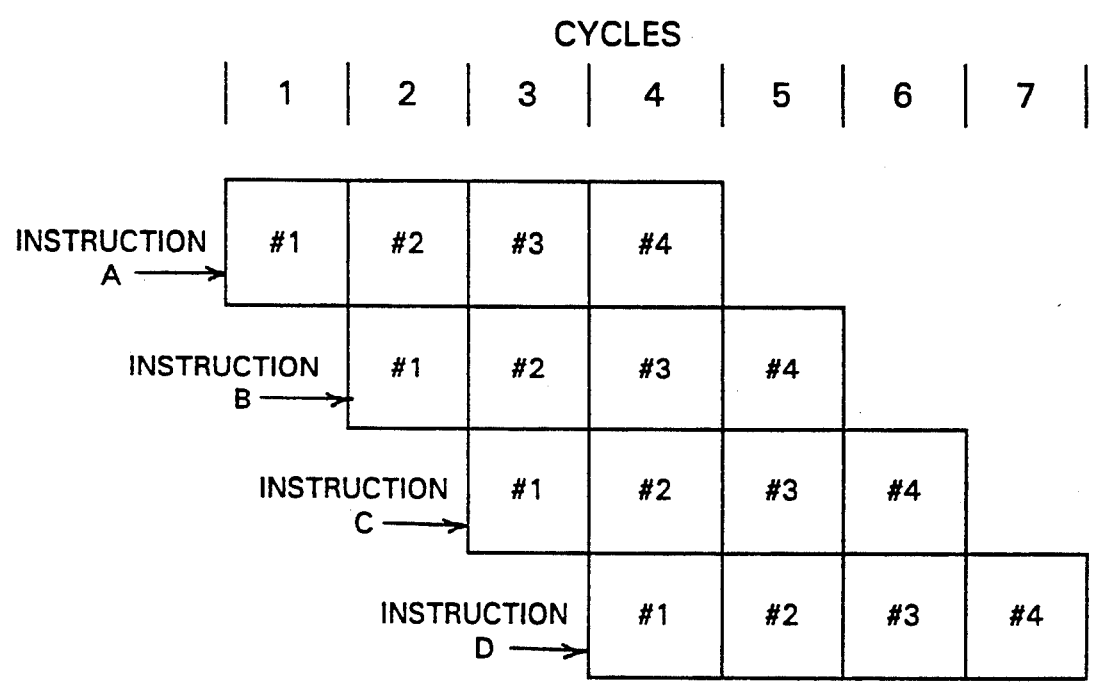
FIG. 2 is a timing diagram of the pipelined stages of FIG. 1.

Referring to FIG. 1, stages of a pipelined computer system are illustrated according to one embodiment of the invention. The computer itself may be, for example, a 64-bit RISC architecture as described in copending application Ser. No. 547,630, filed Jun. 29, 1990, by Richard L. Sites and Richard T. Witek, assigned to Digital Equipment Corporation. The computer system includes successive operational stages 10, 11, 12, and 13 which may be performing functions such as instruction fetch, operand fetch, arithmetic/logic functions, etc. Control stages #1, #2, #3, and #4 temporarily hold sets of the control bits produced by an instruction decoder 14, and these sets are clocked through the control stages #1–#4 on successive clock cycles in a pipelined manner. The operational stages 10, 11, 12 and 13 are in lock step with the control stages, so each operational stage and control stage together define a pipeline stage. Referring to FIG. 2, assuming no stalls or bubbles, control bits for instruction-A would enter stage #1 at cycle-1, then proceed through stages #2, #3 and #4 in cycle-2 to cycle-4. Meanwhile, control bits for instruction-B enter stage #1 at cycle-2, instruction-C at cycle-3, etc. In cycle-4, there are four instructions in the pipeline, a different one in each of the stage #1–#4. While in a stage, the sets of control bits are applied by lines 15 to the controlled operational stages. There may be additional stages to the pipeline, of course. The RISC processor disclosed in the above-mentioned application Ser. No. 547,630 has a seven stage pipeline.

According to the invention, in the control stages, a queue stage 16 is added before the stage #4, receiving the output 17 from the stage #3 under certain conditions. A gate 18 allows either the output 17 from stage #3 or the content of queue stage 16 to be loaded to the stage #4 in a given cycle, as will be explained. Likewise, in the corresponding operational stages, a queue 16' is provided to receive the output of the operational stage 12, and a multiplexer 18' selects the input of the stage 13 to be either the queue 16' or the output of stage 12. The control stages and the operational stages operate in the same manner, with respect to the queue and multiplexer, so only the control stages will be explained. At the first occurrence of a stall in a stage downstream of stage #4, the queue stage 16 is selected as the source of data for stage #4 for the next pipeline advance. The preceding stages #1, #2 and #3 are allowed to load, while stage #4 has to stop. Second and additional stalls require that the entire pipeline be stopped, as in this embodiment, the queue 16 is only one deep.

Referring to FIGS. 3 and 4, this technique according to the invention is illustrated for a sequence of instructions labeled X, A, B and C in the four stage pipeline with control stages #1, #2, #3 and #4.

The queue stage 16 normally loads via output 17 with the same data as stage #4. When a pipeline stall occurs in stage #4 or downstream, the advance command on control lines 19 from pipeline control 20 to stages #1, #2, #3 and the queue stage 16 is asserted even though stage #4 cannot accept new input. Stage #3 sends it's output on lines 17 to the queue stage 16 to avoid stalling the earlier pipeline stages. In addition, this action arms the queue mechanism to catch and trap bubbles. When a bubble enters the queue stage 16 (or the queue stage is empty), the multiplexer 18 switches back to accepting output from stage #3, thus allowing the pipeline to go back to being a four stage pipeline instead of a five stage pipeline by omitting the queue stage. When this switch is made, the bubble may be considered to be overwritten in the queue stage 16, though this is not necessary to eliminate the bubble (it would be overwritten, in any event, upon the next stall condition).

A bubble is ordinarily defined as the condition where a pipeline stage has no useful work to do. The definition can also include a situation where an instruction is completed in an early stage and so subsequent stages do not need to do anything for this instruction (thus a bubble propagates through the pipeline).

Multiple stall cycles must stop the advancement of stages #1, #2, #3 and Q (queue 16) as well as stage #4. Therefore, the advance command for stages #1, #2, #3 and Q is described by the following boolean equation:

load_#1_#2_#3_Q=NOT (stall) OR NOT (using queue)

The advance command for stage #4 is:

load_#4=NOT (stall)

The first equation implies that the only time that stages #1, #2, #3 and Q are NOT loaded is when there is a stall condition AND the queue is already in use.

The multiplexer 18 used to steer data from stage #3 or the queue stage 16 to stage #4 is controlled by an RS latch in the pipeline control 20 that is described by:

set_que=stall cir_queue=(bubble in queue) OR (pipeline flush or reset)

A single state bit indicates whether the flow should proceed directly from stage #3 (if bit is clear) or from the queue 16 (if bit is set). Any stall can set the bit because any stall, even multiple stalls, can continually set the multiplexer 18 into the queue state. The bit can only be cleared when a bubble enters the queue stage 16, indicating that the queue 16 is no longer needed, or the pipeline is flushed to discard all information currently being processed.

Increasing the queue depth of queue 16 can be implemented to provide additional buffering capability in the pipeline; however, in order for this buffering to be of use there must be causes of multiple bubble insertion in need of elimination. In the case of a computer system, this may be advantageous as a result of branch mispredictions, but is highly dependent on the pipeline implementation. If the queue depth of queue 16 is greater than one, the equation referred to above for the advance command for stages #1, #2, #3 and Q would be:

load_#1_#2_#3_Q=NOT (stall) OR NOT (queue full)

so the early stages would continue to operate without stall until the queue was full. In addition, the signal used to clear the RS latch controlling the multiplexer is:

clr_queue=(queue empty) OR (pipeline flush or reset)

Relocating the queue stage 16 is an implementation option; however, any movement of the queue state 16 toward the beginning of the pipeline and away from the source of stalls creates the opportunity for bubbles to advance past the queue stage 16 before a stall cycle occurs. If a bubble advances past the queue stage 16, all opportunity to squash it using the queue has been lost. In this case, a combination of queue stage and other styles of bubble squash hardware can be employed to recoup the potential loss of performance. This trade-off is dependent on the distribution of stall cycles relative to causes of pipeline bubbles. If stall cycles typically occur while processing the instructions closely preceding branch instructions, but not often at other times, then moving the queue 16 can decrease the probability of catching a bubble. If, on the other hand, stall cycles occur often, or with high probability in cycles preceding a branch instruction but not closely preceding, then the probability of catching and squashing the branch delay slot bubble may not be adversely affected.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A pipelined computer system, comprising:
   a plurality of pipeline stages, each said pipeline stage having an input and an output, said input of each of said pipeline stages receiving information from said output of a preceding one of said pipeline stages in a normal mode of operation;
   a bypass queue connected to receive said output of one of said pipeline stages, and switch means to route said output of said one of said pipeline stages through said bypass queue instead of to said input of a next one of said pipeline stages and to connect an output of said bypass queue to said input of said next one of said pipeline stages, in a bypass mode initiated in response to a command;
   control means responsive to a stall occurring in said pipeline downstream of said one of said stages, to generate said command and initiate said bypass mode, said bypass mode being maintained until a bubble enters said bypass queue;
   said control means being responsive to a bubble entering said queue stage to terminate said bypass mode and initiate said normal mode and cause said next one of said stages to receive the output of said one stage directly via said switch means.

2. A system according to claim 1 wherein said switch means includes a multiplexer having inputs receiving said output of said one stage and said output of said bypass-queue, said multiplexer selecting said input of said next stage in response to said command.

3. A system according to claim 2 wherein said pipeline stages, said bypass-queue, and said control means are all controlled by a clock.

4. A system according to claim 3 wherein said control means causes said bubble to be eliminated when said bypass mode is terminated.

5. A system according to claim 4 wherein said bypass-queue has a depth of one.

6. A method of operating a pipelined computer system, comprising the steps of:
   performing operations in sequence in a plurality of pipeline stages, each said pipeline stage having an input receiving information from an output of a preceding one of said pipeline stages;
   bypassing said information from said output of one of said pipeline stages into a bypass-queue instead of allowing said output of said one of said pipeline stages to be coupled to the input of the next one of said pipeline stages, and directing an output of said bypass-queue to said input of said next stage, in response to a command;
   generating said command in response to a stall occurring in said pipeline downstream of said one of said stages; and
   in response to a bubble entering said bypass-queue, negating said command and causing said input of said next one of said stages to receive information directly from said output of said one of said stages.

7. A method according to claim 6 including synchronizing said steps of performing operations, bypassing, and generating, by a clock.

8. A method according to claim 7 including eliminating a bubble in said bypass-queue when said command is negated.

9. A method according to claim 6 including the step of selecting said input to said next stage by a multiplexer responsive to said command, said output of said one stage and said output of said bypass-queue being coupled to inputs of said multiplexer.

10. A method according to claim 6 including storing said information in said bypass-queue to a depth of one.

11. A method according to claim 6 wherein said information is decoded program instructions.

12. A pipelined computer system, comprising:
   a plurality of pipeline stages, each said pipeline stage having an input and an output, said input of each of said pipeline stages receiving information from said output of a preceding one of said pipeline stages;
   a queue connected to continuously receive said output of one of said pipeline stages, and switch means to prevent said output of said one of said pipeline stages from going to the next one of said pipeline stages and to connect an output of said queue to said input of said next one of said pipeline stages, in response to a command, so that said input of said next one of said pipeline stages receives information from said output of said queue stage continuously until a bubble enters said queue stage;
   control means responsive to a stall occurring in said pipeline downstream of said one of said stages, to generate said command;
   said control means being responsive to a bubble entering said queue stage to negate said command and cause said next one of said stages to receive the output of said one stage via said switch means, rather than from said queue stage, when said queue stage is empty.

13. A system according to claim 12, said switch means including a multiplexer to receive said output of said one stage and the output of said queue stage to select an input of said next stage, in response to said control means.

14. A system according to claim 13 wherein said pipeline control stages, said queue stage and said control means are all controlled by a clock.

15. A system according to claim 12 wherein said control means causes eliminating a bubble in said queue stage when said input to said next stage is switched back to said output of said one stage.

16. A method of operating a pipelined computer system, comprising the steps of:
   performing operations in sequence in a plurality of pipeline stages, each said pipeline stage having an input receiving information from an output of a preceding one of said pipeline stages;
   continuously loading a queue stage connected to receive the output of one of said stages, and, in response to a command, instead of allowing said output of said one of said pipeline stages to be coupled to the input of the next one of said pipeline stages, directing an output of said queue stage to said input of said next stage;

generating said command in response to a stall occurring in said pipeline downstream of said one of said stages; and in response to a bubble entering said queue stage, negating said command and causing said next one of said stages to receive information from said output of said one of said stages when said queue stage is empty.

17. A method according to claim 16 including selecting said input of said next one of said stages by a multiplexer to receive said output of said one stage or the output of said queue stage.

18. A method according to claim 16 wherein said pipeline stages, said queue stage and said control means are all controlled by a clock.

19. A method according to claim 16 including eliminating a bubble in said queue stage.

20. A method according to claim 16 wherein said queue stage has a depth of one.

* * * * *